US005558269A

United States Patent [19]

Wallace

[11] Patent Number: 5,558,269

[45] Date of Patent: Sep. 24, 1996

[54] ANGULAR POSITIONING DEVICES FOR STAINED GLASS CRAFT ITEMS

[76] Inventor: Mark P. Wallace, 1655 Sharon Way, Clearwater, Fla. 34624

[21] Appl. No.: 387,255

[22] Filed: Feb. 13, 1995

[51] Int. Cl.[6] .................. B23K 3/00

[52] U.S. Cl. .................. 228/49.1; 269/41

[58] Field of Search .................. 24/67 CF; 211/50; 403/402, 403; 269/41; 228/49.1

[56] References Cited

U.S. PATENT DOCUMENTS

| | | | |
|---|---|---|---|
| 2,100,720 | 11/1937 | Page | 211/50 X |
| 4,033,570 | 7/1977 | Curlow | 269/41 |
| 4,209,164 | 6/1980 | Brothers | 269/37 |
| 4,815,364 | 3/1989 | Wagner et al. | 403/402 X |
| 5,224,691 | 7/1993 | Clark | 269/51 |
| 5,251,751 | 10/1993 | Prussen | 206/338 |

*Primary Examiner*—Kenneth J. Ramsey

[57] ABSTRACT

An alignment fixture having a base and two sides situated so as to form three mutually orthogonal planes is used to align the sides of stained glass boxes and box like items having square corners and also to hold the sides in position while the corner joint formed by the convergence of two sides is tack soldered. Further a second alignment device having a base and sets of sides mounted perpendicular to said base and at some desired angle to each other is used to align the sides of stained glass boxes and box like devices having internal angles between adjacent sides other than ninety degrees and to hold the sides in position while the corner joint formed by the convergence of two sides is tack soldered. A third angular alignment device is used to align the panels of a stained glass panel lampshade having some fixed number of sides. The device allows panels to be aligned and clamped in the proper three dimensional orientation one panel at at a time until the assembly is complete and ready for soldering.

11 Claims, 7 Drawing Sheets

ANGULAR POSITIONING DEVICES FOR STAINED GLASS CRAFT ITEMS

BACKGROUND OF THE INVENTION

1. Field of the Invention

This invention relates in general to the stained glass craft industry and in particular to providing angular guides for positioning the sides of three dimensional stained glass objects.

2. Prior Art

One of the common difficulties encountered by stained glass artists and crafters is the accurate positioning of sides for three dimensional objects such as boxes, candle holders, and lampshades. In order for the finished piece to be aesthetically pleasing, it is necessary that square corners of objects actually be square and that items having more than four sides have the sides arranged in a regular pattern such that the eye cannot detect any noticeable difference between the angles formed by each pair of sides. This problem has been addressed by one manufacturer of stained glass related products.

Morton Glass Works of Morton, Ill. has marketed a device called the GS Assembly Tray which is a plastic tray with three dimensional cavities molded into the tray in such a manner that pieces of glass can be laid against adjacent sides of a cavity with such pieces located relative to each other at some desired angle. While the device attempts to resolve alignment difficulties, it has several drawbacks. The first is the requirement that a straight wire having the approximate thickness of the glass be set in the corner of the cavity formed by the two sides being used to position the glass. The purpose of this wire is to aid in the formation of a true corner joint in which only the inside edges of the glass pieces touch. If the wire is not used or is of a diameter smaller than the glass thickness, there is a good possibility that one edge will overlap the other. If beveled glass is being used for the sides, the wire serves no useful purpose since the bevels create a void area in the corner. The second drawback is that once the sides are positioned, it is not possible to view both sides of the seam so there is some uncertainty as to whether or not the sides have been positioned properly before tack soldering. The third drawback is that when the sides and base of a box are properly positioned in the device, only the insides of the seams are visible and available for tack soldering. Additionally the manufacturer's recommendation is that only the inside corner formed by the three sides be soldered. This is often awkward because the portion of the inside of the joint capable of accepting solder is quite small and the sides and base interfere with the relatively fat soldering iron. The fourth drawback is that the cavities are sized to handle relatively small pieces of glass. If the glass piece being used extends too far beyond the top edge of the cavity, gravity will cause it to pivot about this edge of the cavity and either fall or skew out of position unless one hand is used to support the pieces leaving only one hand free to tack solder. The fifth drawback is that the manufacturer specifically limits the user to performing modest tack soldering since the tray cannot withstand the heat of soldering a seam. Inadvertent contact with a hot soldering iron will also melt the tray at the point of contact.

The most common method taught students for forming the square corners of a box follows. Position and fix two straight edged pieces at a ninety degree angle or actually position and fix a carpenter's square on a work surface. Using the corner thus formed, position two pieces of glass against each edge and hold them together in such a manner that the corners of the glass touch. While holding the pieces together with one hand, tack solder the top of the corners together and check the alignment. If it is not acceptable, melt the tack with a soldering iron, reposition, and tack until it is. Then run small tacks along the seam. Rotate the assembly ninety degrees and add a side repeating the process for aligning and tacking until all four sides are tacked together. This method, while common, has the drawback that while the bottom edges of the glass may be positioned at ninety degrees in a horizontal plane, it is very difficult to assure that the sides, as they are tacked in position, lie in a vertical plane. If, as is also quite common, one of the pieces of glass is not cut square with the bottom edge, the attempt to align the edges of the glass can actually force one or both sides out of a vertical plane. Thus it becomes more difficult to align subsequent sides. The alignment problem is exacerbated since it frequently takes two hands to put the pieces in proper alignment. The crafter must then hold them in position with one hand while tack soldering with the other.

When making boxes with more than four sides, the most common practice is to lay out the angle between two sides on a work surface, affix two straightedges to the worksurface along the lines, and repeat the process noted above for the rectangular box. The alignment difficulties associated with making a square cornered object are increased since there are more opportunities for vertical misalignment. Once again the problem of needing both hands to obtain the proper alignment and then trying to hold that alignment with one hand while tack soldering with the other arises.

Perhaps the most difficult alignment problem of all stained glass projects is making a lampshade comprised of some number of individual panels whose sides are tapered to form the flare of the lampshade. The alignment problems associated with a box are now compounded because the panels do not lie in a vertical plane and are actually to be inclined to the horizontal at some unknown angle. The most common technique taught to align the sides into a nominal conical shape is quite complicated. The first step is to lay out the panels on a flat surface with their tapered sides touching and forming an arc. Next the panels are separated a small amount from each other with the edges of adjacent sides remaining parallel. The sides are then taped into this position by running some kind of adhesive tape from side to side until all sides are held in their relative positions. The next step is to pick up the sides starting at the center of the smallest arc until all the sides are resting on their bottom edges. After pulling the two end sides into a position in which their edges touch, they too are taped together. The sides are then carefully arranged into a regular pattern to determine if too much or too little gap was left between the sides before the tape was applied. The gap is required because when the sides are moved from a horizontal plane to the plane of the cone, the inside edges of the glass will become closer together. If the inside edges are now too far apart, the process will have to be repeated with a smaller gap. The next step is to turn the assembly upside down and set it into some circular shaped device such as a bowl or a can whose opening approximates the diameter of the middle of the cone. This allows the glass pieces to rest against the restraining diameter while the tape prevents them from rotating about the support point. The lampshade is now somewhat stable and the inside seams may be tack soldered. However, it is possible that the heat of the tack soldering can burn the tape on the outside of the lamp particularly any tape below the rim of the support device since it cannot be seen if the inside corner edges actually touch. Once the lampshade has been soldered sufficiently to gain some strength, it may be removed carefully from the bowl or can and finish soldered. Care must still be exercised because the tack soldering may not prevent the nominal circular cross section from deforming into an oval. Making a stained glass panel lamp-shade is a difficult process with many different parameters to control such as setting the gap between the sides properly, taping the sides securely enough so that the tape will support the glass but won't remove the copper foil burnished to the edges of each piece when the tape is removed, and assuring that the sides remain uniformly positioned during soldering so the lamp retains a "circular" cross section.

No device is known that can positively position the sides of stained glass boxes at the proper horizontal angle while assuring that they remain in a vertical plane and further can hold the sides in this position while being tack soldered. Additionally, no device is known that can positively position the sides of a stained glass panel lampshade easily and correctly and hold the sides in this position.

SUMMARY OF THE INVENTION

The principal object of this invention is to provide devices which will position and hold the sides of stained glass boxes and box like items in the proper horizontal and vertical orientation while leaving the user's hands free to perform the tack soldering operations.

It is also an object of this invention to provide positioning devices for stained glass boxes and box like items that permit the user to tack solder the outside face of a corner joint and to view both sides of the seam being tacked and both sides of the entire assembly at all times during the assembly process.

Another object of this invention is to provide positioning devices for stained glass boxes and box like items which can act as quality control devices by detecting faults with the glass sides prior to incorporating them into the final assembly.

An additional object of this invention is to provide devices which will position and hold the sides of a stained glass panel lampshade in the proper horizontal and vertical orientation in such a manner that tack soldering is not required and the user's hands remain free to perform the finish soldering operations.

A further object of this invention is to provide stained glass positioning devices which can withstand inadvertent contact with soldering irons, liquid solder, and flux without sustaining damage which would render them unusable.

Another object of this invention is to provide stained glass positioning devices which are simple to use and of inexpensive construction.

The foregoing objects can be accomplished by providing fixtures constructed of transparent material and machined and assembled in such a manner as to provide fixed, three dimensional geometric references for the box being constructed and by providing alignment devices configured at the angle necessary to position and clamp the top and bottom ends of adjacent panels of a stained glass lampshade to a series of these devices to form a lampshade having some fixed number of sides.

DETAILED DESCRIPTION

Figure 1:
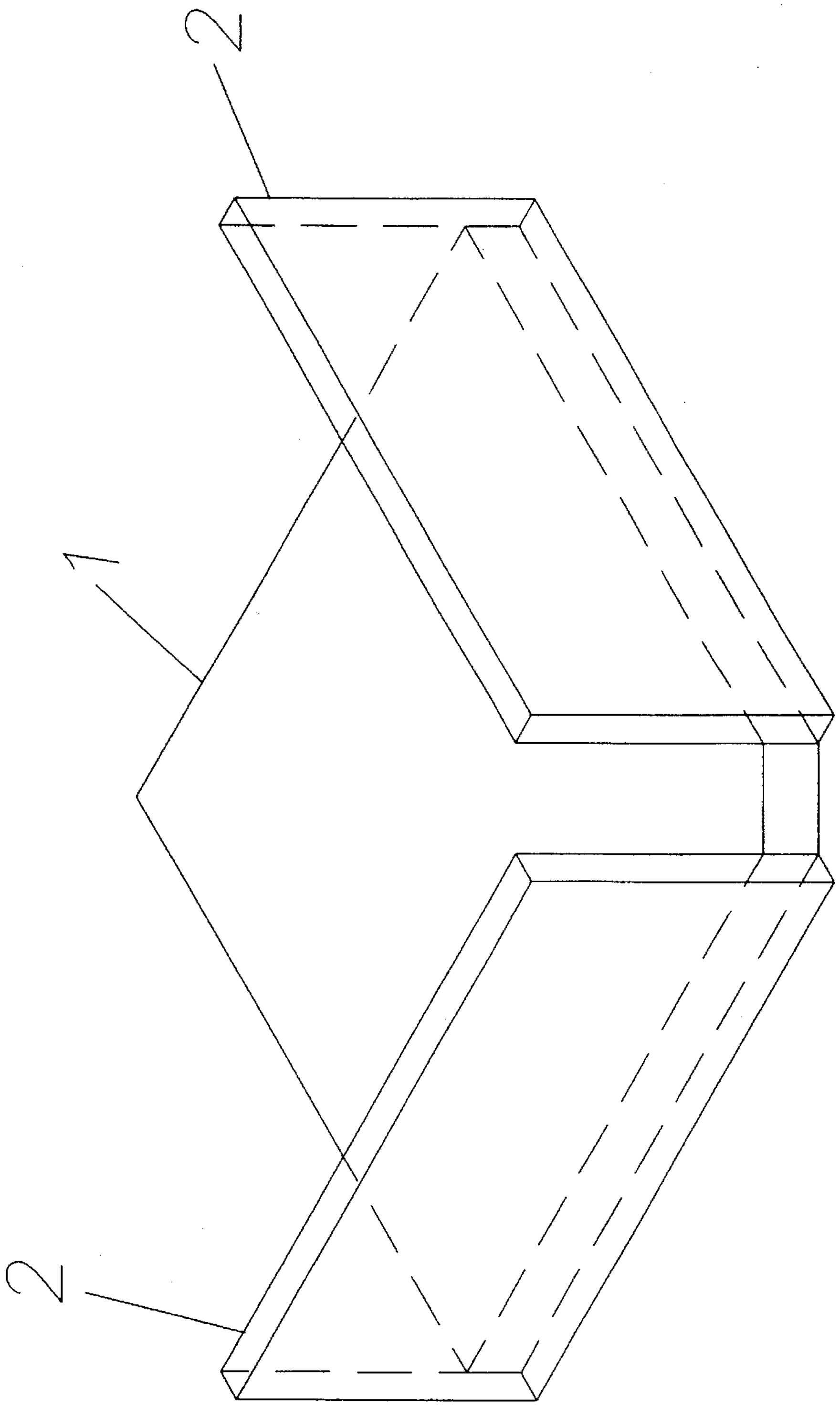
FIG. 1 is a top perspective of a device for aligning the sides of square cornered stained glass boxes.

Refer now to FIG. 1 which is an overall drawing of the preferred embodiment of a fixture for properly positioning the sides of stained glass boxes and box like items comprising a horizontally oriented base 1, and two identical, vertically oriented sides 2. The preferred material for the base and sides is acrylic commonly known as plexiglass. This material is completely transparent.

The base 1 is cut from a sheet of material to a square shape and one corner is then chamfered at a 45° angle. The two edges of the base 1 adjacent to the chamfer are then machined such that they are perpendicular to each other and the face of each is perpendicular to the top surface of the base. The vertical sides 2 are cut to the proper length and width and then positioned on the two machined surfaces of the base using the edge of the chamfer to locate one end of each side with the lower edge of each side essentially flush with the bottom of the base 1. The upper edge of each side 2 lies at some distance above the top of the base 1. The sides 2 are attached to the base 1 by means of an adhesive. This assembly thus forms three fixed, mutually orthogonal planes consisting of the top of the base 1 and the inside surfaces of the sides 2. Thus, when the FIG. 1 device rests on a level surface, stained glass box sides positioned against the sides 2 must themselves lie in a vertical plane and be perpendicular to each other.

The preferred dimensions of the FIG. 1 device are the base 1 having a thickness of nominally ½ inch and a length and width of 6 inches. The chamfer at one corner of the base 1 is ½ inch by 45°. Each side 2 has a nominal thickness of ¼ inch, a width of 2-¾ inches and a length of 5-½ inches.

Figure 2A:
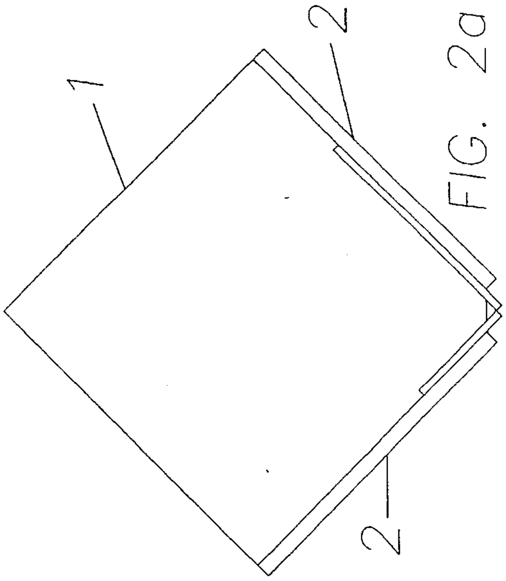
FIG. 2*a* through FIG. 2*d* shows a step by step example of forming a rectangular stained glass box using the FIG. 1 device.

The operation of the FIG. 1 device is simple. The general case of a square cornered box is a rectangular box. Referring to FIG. 2*a*, the user positions the FIG. 1 device on a level surface with the chamfered corner pointing directly at him. Next the user positions two adjacent sides of the intended stained glass box, in this case a short side and longer side, against the sides 2 with the bottom edges of the glass pieces resting on the base 1. While holding each glass piece against the sides 2, the user slides the glass pieces along the base 1 until the inside corner edges of the glass pieces touch. While still holding each glass piece against the sides he then pushes the glass pieces together with a slight amount of force. It is believed that this small force exerted on the edges of the glass in contact slightly deforms the copper foil, previously burnished to all edges of the glass sides, thus creating tiny interlocking points along the edge and allowing the user to release the glass sides. They will stay in the position indicated, mutually perpendicular to each other and the top of the base 1. Now the user may tack solder the corner joint, using both hands, starting with a tack at the top of the corner. The chamfered corner on the FIG. 1 device exposes the entire outside face of the corner joint which facilitates the tack soldering because the sides of the box do not interfere with the relatively fat tip of the soldering iron as they might if attempting to tack solder the inside of the seam.

Figure 2B:
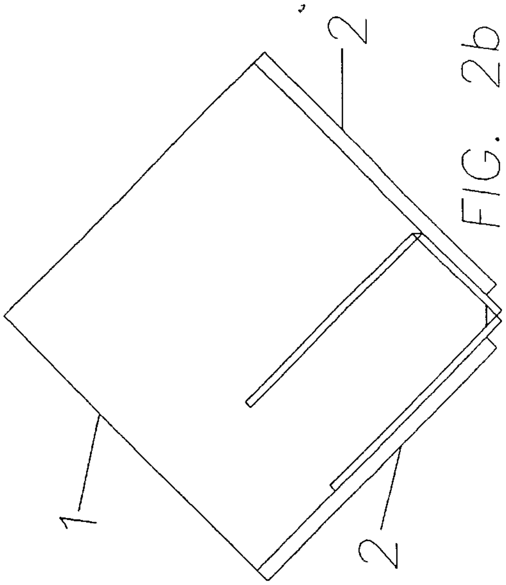

The FIG. 1 device is also designed to allow any excess flux or liquid solder to fall to the work surface since the corner joint does not lie above the base 1 but is actually located in space because of the chamfer on the base 1o Thus soldering materials will not accumulate on the FIG. 1 device. Refer now to FIG. 2*b* which shows construction of the box continuing by rotating the first two sides, now tack soldered together, ninety degrees in either direction and adding a third side. The process of holding two adjacent glass pieces against the sides 2 of the FIG. 1 device and sliding them toward each other until the inside edges of the glass pieces meet is repeated. Again the two sides are forced together slightly to lock them in position. The user may now use two hands to tack solder this seam.

Figure 2C:
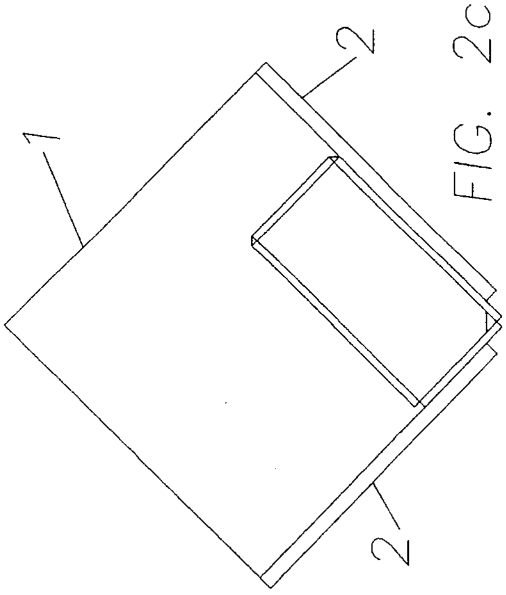

Refer to FIG. 2*c* which depicts the last side of the box being added in an identical process to adding the third side. After positioning the sides and forcing them together as before, the user may tack solder this joint.

Figure 2D:
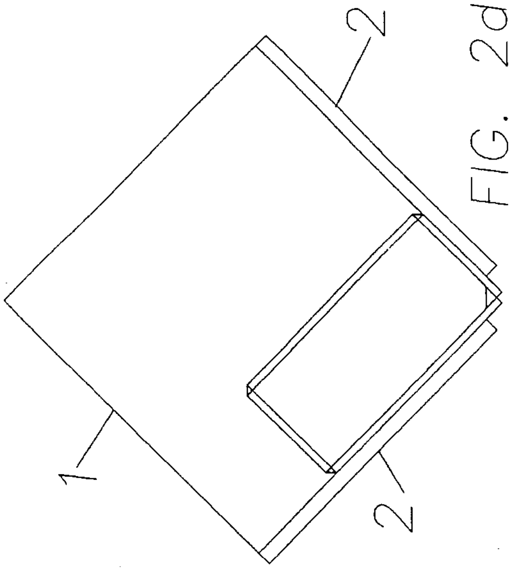

Refer to FIG. 2*d* which shows the first and fourth sides of the box now positioned against the sides of the FIG. 1 device and the last corner joint made. The same positioning process is repeated and the joint is tack soldered. The sides of the box are now complete with all corners being square. The base of the box can now be set on and tack soldered to the sides to provide stability for positioning the box for finish soldering the seams.

Figure 3:
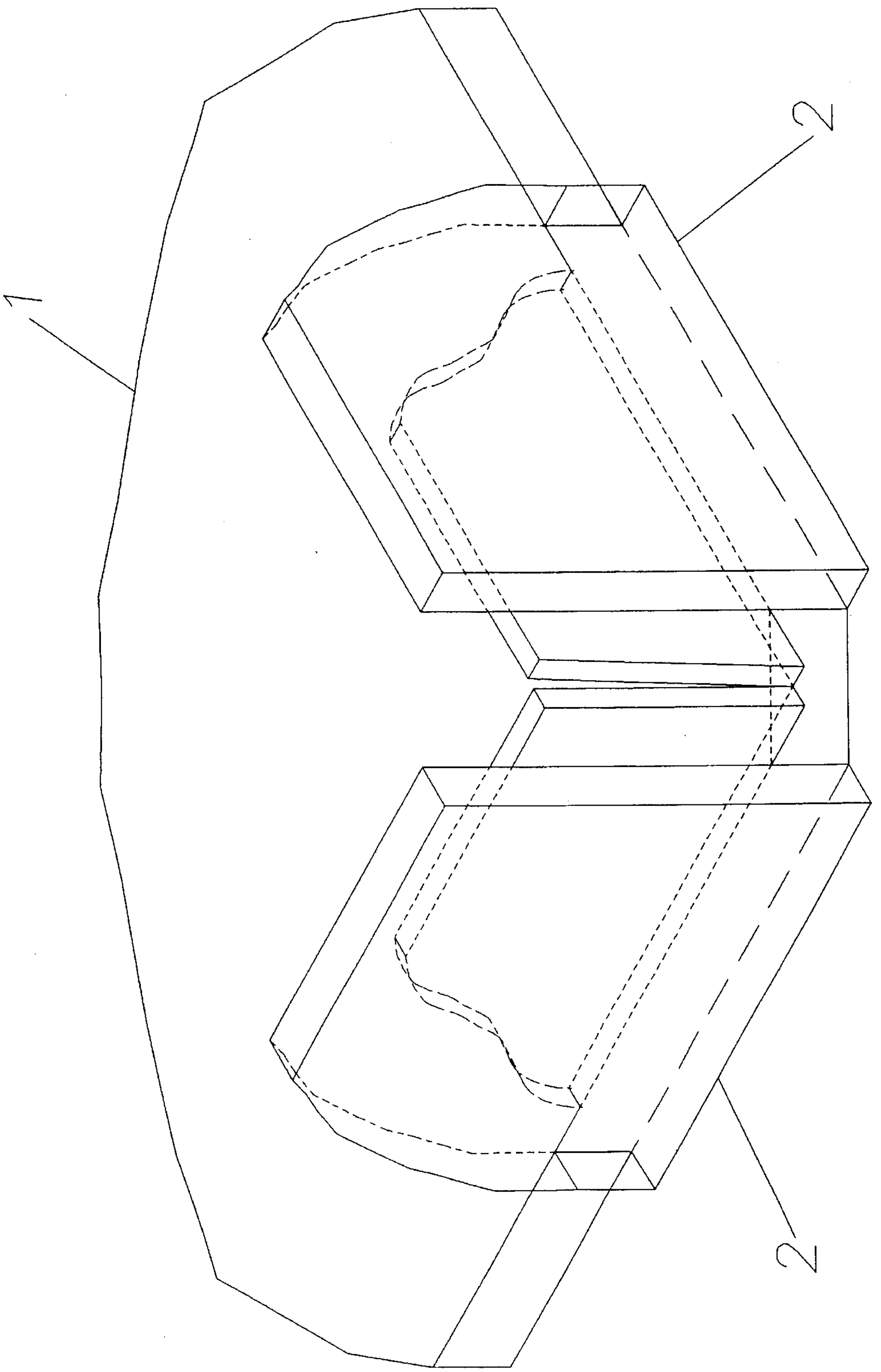
FIG. 3 is a fragmentary perspective of a corner of the FIG. 1 device showing how glass cutting errors can be detected.

Refer now to FIG. 3 which is a fragmentary top perspective view of the chamfered corner of the FIG. 1 device depicting the edges of two glass sides forced into contact with each other where one edge of a glass side was cut out of square with the side of the glass piece resting on the base 1. Because the glass sides themselves are being forced against three mutually orthogonal planes of the FIG. 1 device, the FIG. 1 device allows the user to detect angular cutting errors made on one of the glass sides. In the case of FIG. 3, it is an easy matter to determine that one glass side is not cut properly because the inner edges of the sides meet at a point instead of a line. The user now has options. The "bad" side can be discarded, repaired by grinding, or ignored. In many cases, the error can be ignored simply by filling in the gap with solder since the change in the width of the solder joint at one corner will probably not be noticed.

Without the FIG. 1 device the user most probably would have tilted one side out of a vertical plane until the edges met, tilted the bottom of one side out of a horizontal plane until the edges met, or done a combination of the two. The result would have been an ill fitting box. Thus, in addition to positioning the sides properly, the FIG. 1 device also acts as a quality control device to identify problem fits and give the user the opportunity to remedy the problem immediately before continuing with the assembly. Because the FIG. 1 device is constructed of a transparent material, the user is able to see all sides of the box as the assembly progresses. This can be a considerable aid to the user particularly when constructing the box of glass having similar patterns but different textures on opposite sides. Mistakes can be seen easily.

Figure 4:
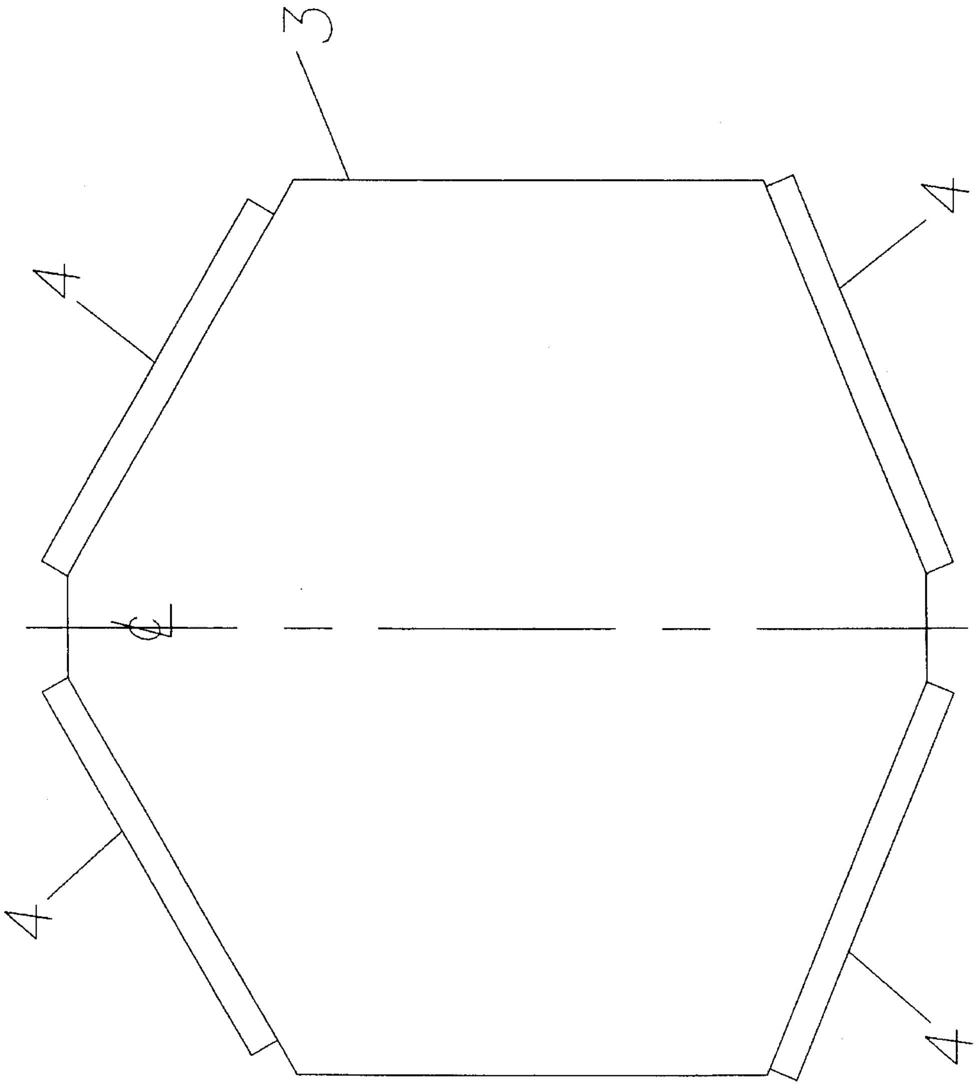
FIG. 4 is a plan view of a device for aligning the sides of glass boxes having other than square corners.

FIG. 4 is a plan view of an alignment fixture for properly positioning the sides of stained glass boxes and box like items having adjacent sides oriented to each other at angles other than 90°. The device shown in FIG. 4 is expressly configured to produce hexagonal and octagonal boxes and box like items. The FIG. 4 device comprises a base 3 and four identical sides 4. The base 3 is machined in such a manner so as to create a 120° included angle between one set of sides and a 135° angle between the other set of sides with the sides located symmetrically about the centerline indicated. The angles noted are the interior angles of hexagons and octagons respectively. In general the sides may be oriented to each other at the same internal angle as that between the sides of the desired stained glass box which may have any number of sides. The edges of the base 3 against which the sides 4 fit are machined such that the machined surface created is perpendicular to the top surface of said base thus forcing the sides, and any flat objects held against them, to be perpendicular to the plane of the base. The base 3 is also machined to create a chamfer at the theoretical intersection of the sides which terminate at the edges of the chamfer. The two sets of sides 4 are positioned on the base 3 in such a manner that if they were each extended to the points where they intersect, the points of intersection would lie outside the perimeter of the base. This design permits any excess flux or solder to fall to the work surface and not accumulate on the base 3 since the corner joint formed by the glass sides is actually located in space beyond the perimeter of the base 3.

The preferred material for both the base 3 and the sides 4 of the FIG. 4 device is acrylic which is completely transparent. The preferred dimensions of the assembly are a base 3 thickness of ½ inch, a side 4 thickness of ¼ inch, the height of the base 3 of 7-¼ inches and a width of 7-½ inches, and the sides 4 having a length of 3-½ inches and a height of 2-¾ inches. The sides 4 set at an internal angle of 120° are separated at the edge of the base 3 by a distance of 0.86 inches. The sides 4 set at an internal angle of 135° are separated at the edge of the base 3 by a distance of 0.92 inches. The sides 4 are attached to the base by means of an adhesive with the lower edge of each side set flush with the bottom edge of the base 3. When set on a level work surface, the completed assembly now contains a horizontal plane formed by the top of the base 3, four sides 4 set perpendicular to this horizontal plane, and opposite sets of said sides oriented to each other at the internal angles of a hexagon and an octagon.

The FIG. 4 device is used in the same manner as the FIG. 1 device. The bottom edges of two stained glass sides of a box are set on the base 3 and held against the set of sides 4 which will produce the desired final shape of a hexagon or an octagon. The glass pieces are then slid together while still in contact with the sides 4 until the inner edges of the glass pieces come into contact. The glass pieces are then pushed together with a slight force to permit them to remain in position without further hand pressure. The two pieces can then be tack soldered together on the top and outside face of the corner joint using both hands in the same manner as described for the use of the FIG. 1 device. The design of the FIG. 4 device is also such that the entire outside face of the corner joint formed by the glass pieces is completely exposed. Additional glass sides of the box are added in the same manner as that described for the FIG. 1 device with the only exception being that the tack soldered assembly will be rotated either 120° or 135° depending on the final shape desired in lieu of the 90° stated for the FIG. 1 device. Each added side is positioned and tack soldered in the same manner until the box is complete. Once all the sides have been properly positioned and tack soldered, the base of the box can be added and tack soldered to the assembly to provide stability and stiffness for positioning the box for final soldering of the seams.

Because of the geometric relationship between the base 3 and sides 4, the FIG. 4 device also allows the user to detect angular cutting errors made on one of the glass sides. The detection method and possible corrective actions to take are the same as those shown previously for the FIG. 1 device.

Because the preferred material of construction for the FIG. 4 device is completely transparent, the user is able to view the entire box assembly as it proceeds. In addition, the FIG. 4 device exposes the entire outside face of the corner joint formed by either set of sides 4 which facilitates the tack soldering operation because the sides of the box cannot interfere with the relatively fat soldering iron when attempting to place solder in the joint.

The acrylic material preferred for the construction of both the FIG. 1 device and the FIG. 4 device is resistant to the effects of soldering flux and will withstand inadvertent contact with a hot soldering iron with no apparent damage. Liquid solder, when dropped on the material and allowed to cool, can be removed easily but may leave a minor blemish on the surface of the material. Therefore, the material is considered to have resistance to the effects of liquid solder.

Figure 5:
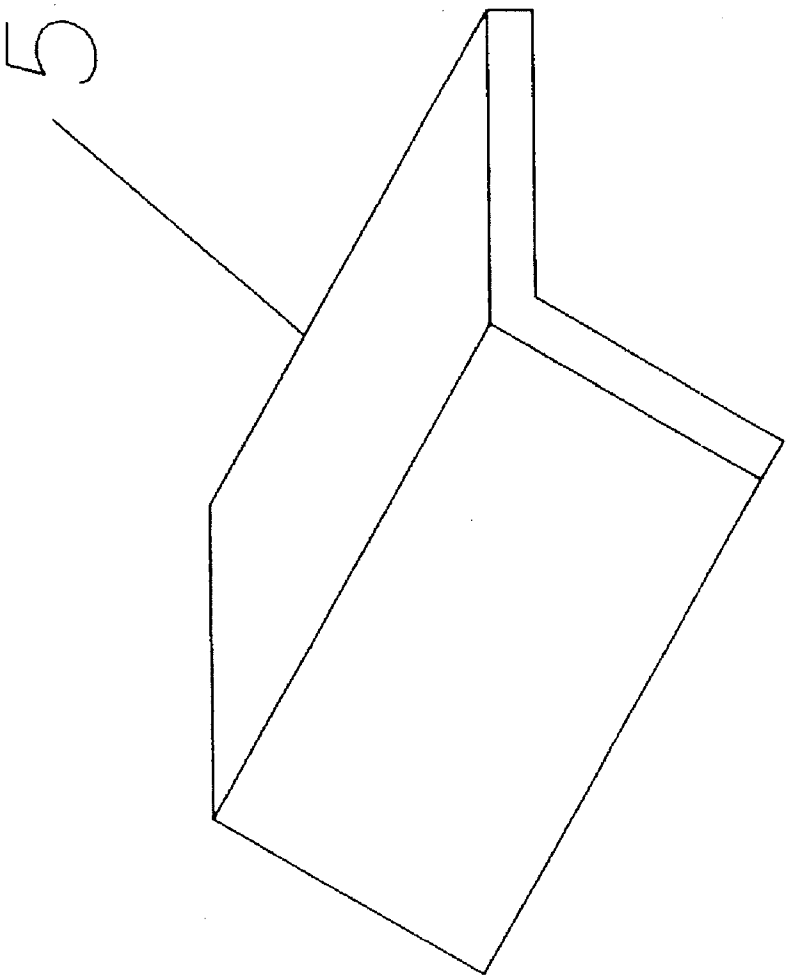
FIG. 5 is a top perspective of a device for positioning the sides of stained glass panel lampshades.

FIG. 5 is an overall view of an alignment guide 5 used to position and hold the panels of a stained glass panel lamp at the proper three dimensional orientation relative to each other such that the lampshade will assume its finished form when the desired number of panels are included in the assembly. The alignment guide consists of two connected flat surfaces intersecting at a common edge with said surfaces aligned to each other about the common edge at the same internal angle as that found between the sides of a panel lampshade.

One alignment guide 5 is used at the end of each seam between adjacent panels of a stained glass lampshade. The glass panels are held against the guide 5 by means of a clamp.

The preferred material of the alignment guide 5 is rigid polyvinylchloride, PVC. The preferred method of construction is to extrude the desired shape of the alignment guide through a set of dies and then to saw the length of guide thus produced into shorter lengths as required. The preferred dimensions of the alignment guide are the guide surfaces having a nominal thickness of ⅛ inch, a length of 1-⅜ inches, and a width of each surface of ⅞ inch measured from the common edge. The internal angle formed by the two surfaces is that internal angle formed by the panels in a given lampshade.

Therefore, a family of alignment guides can be developed with each member having the specific internal angle associated with a specific lampshade. Each family member may be manufactured from the preferred material but having a different color from any other family member in order to make recognition easy.

Figure 6:
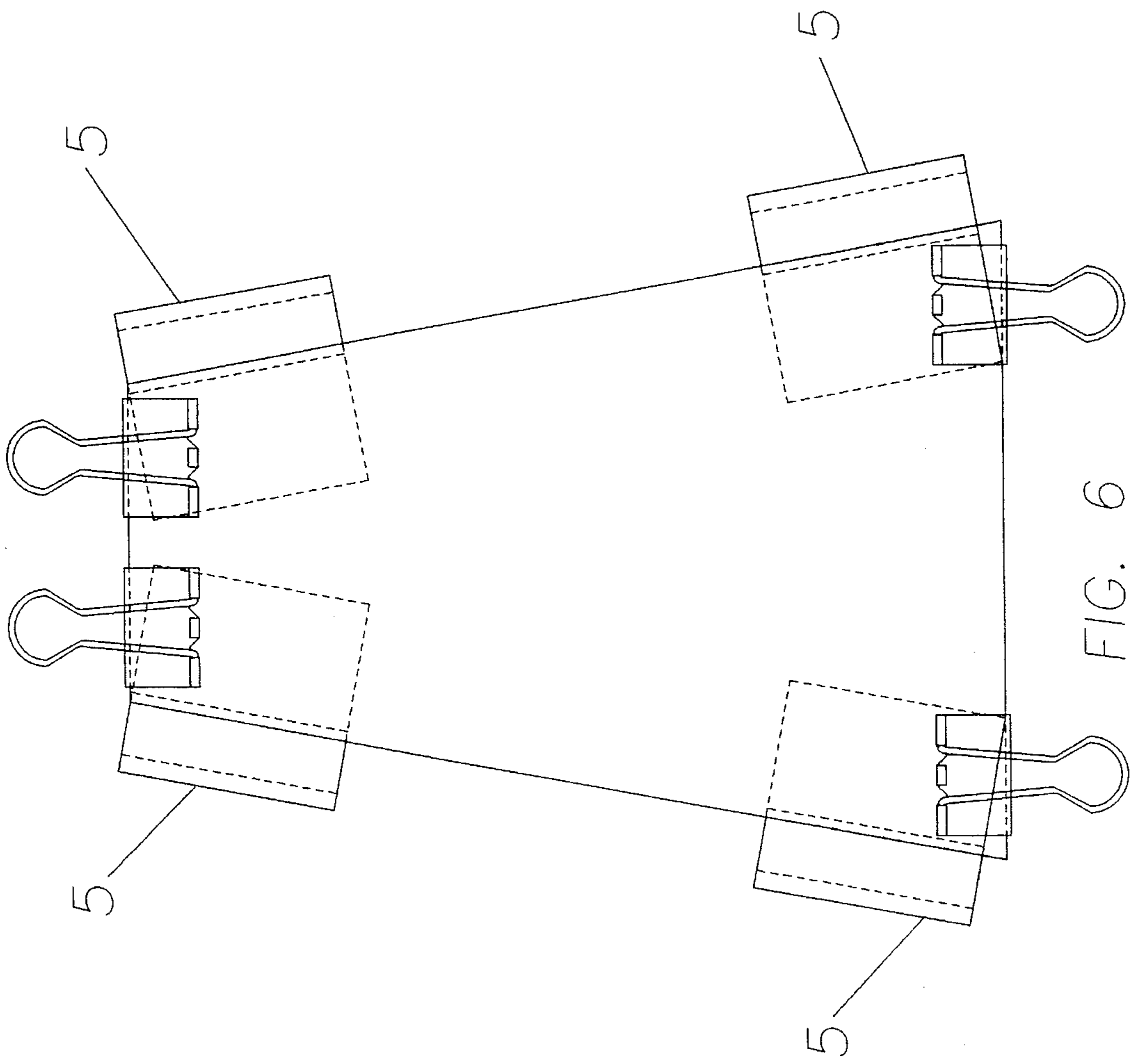
FIG. 6 is a view of one panel of a stained glass lampshade showing the attachment of the FIG. 5 devices at each corner.

FIG. 6 shows four FIG. 5 devices attached to a panel of a stained glass panel lampshade. One device is attached to each corner of the panel by means of a clamp such that the common edge between the two flat surfaces of said device is aligned with the inner edge of the panel. The FIG. 5 devices are attached to the inside face of the panel and aligned to the panel such that the intersection of the two alignment surfaces of the said device is flush with the edge of the panel. The free surfaces of the four FIG. 5 devices attached to this panel define the planes in which the adjacent panels must lie.

Figure 7:
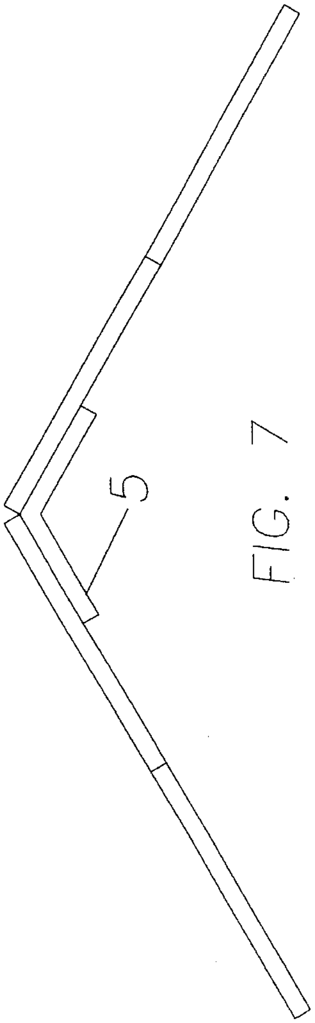
FIG. 7 is a view looking straight down the seam of two adjacent panels aligned with the FIG. 5 device.

FIG. 7 shows a view of two adjacent stained glass lamp panels looking directly down the seam between the two panels with both panels properly oriented with their inside corner edges in contact. The attachment clamps are not shown in this view for clarity. The inside edge of each panel is directly aligned with the common edge of the two alignment surfaces of the alignment guide 5.

Figure 8:
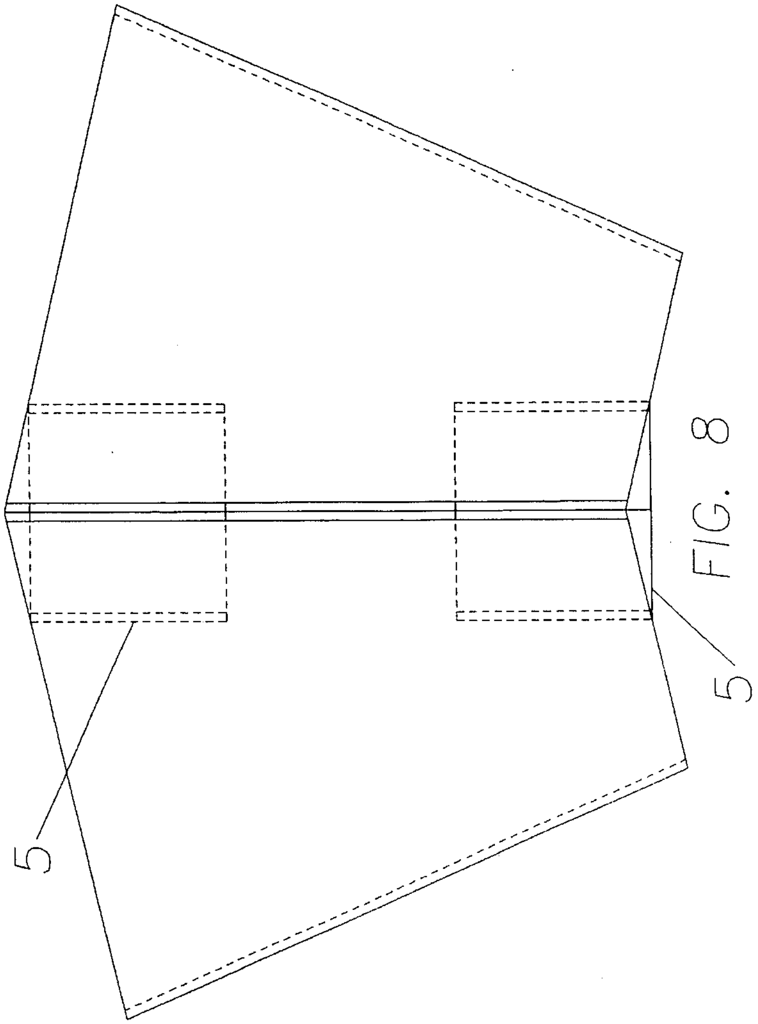
FIG. 8 is a plan view of the view shown in FIG. 7.

FIG. 8 is a plan view of the panels shown in FIG. 7 showing how the alignment guides 5 may be located at the end of each seam. Again in this view the attachment clamps are not shown for clarity.

Because adjacent panels can be properly aligned and held in that position, additional panels can be added to the assembly one at a time. Minor adjustments between panels can be made easily by loosening the clamp holding the panel to a guide, making the adjustment, and resetting the clamp. Once the last panel has been added to the assembly, the lampshade is aligned and held in its final form. The assembly may then be picked up and positioned for soldering the seams between the panels. Tack soldering the seams is not required.

In the present invention, the geometries of the FIG. 1 and FIG. 4 devices permit a stained glass crafter to position accurately the sides of stained glass boxes and box like items and to retain them in this position for tack soldering without the use of hands or clamps so that the tack soldering can be performed using both hands. The FIG. 5 device permits a stained glass crafter to align accurately the adjacent sides of a stained glass panel lampshade by clamping the corners of the panels to the alignment surfaces of said device. The FIG. 5 device also permits panels to be added to the assembly of a lampshade one at a time. Once the last panel has been aligned with the FIG. 5 device and clamped in position, the assembly can be picked up easily and positioned for soldering the seams without the need to perform any tack soldering.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A plurality of distinctly coded sets of angular alignment guides, each set being designed to hold the sides of a stained glass lampshade in assembly position for soldering and being color coded or being otherwise marked thereon according to the angle corresponding to the internal angle of the assembled sides of a specific lampshade, each set of guides comprising twice the number of angular brackets as the number of sides of said lampshade, each bracket being composed of two sides joined together and forming the same internal angle as that corresponding to the internal angle formed between two adjacent sides of an assembled lampshade.

2. The plurality of coded sets of angular alignment guides as in claim 1 wherein the sets are color coded.

3. An alignment fixture for the proper positioning and assembly of the side members of stained glass box and box like items comprising a base and at least two sets of two planar sides mounted orthogonally to the base, a first set of sides being arranged together so as to form a first angle equal to the internal angle of a regular polygon having a first number of sides and a second set of said sides being arranged to form a second angle equal to the internal angle of a regular polygon having a number of sides different from said first number, wherein the base and sides of the fixture are cut away at the theoretical juncture of each set of sides so that the seam formed between two side members when positioned against the sides of a set and pushed together is exposed for an assembly operation.

4. The fixture of claim 3 wherein the assembly operation is soldering and the fixture is resistant to the effects of soldering flux, liquid solder, and inadvertent strikes by a hot soldering iron.

5. The fixture of claim 3 wherein the fixture is made of transparent plastic.

6. The fixture of claim 5 wherein the plastic is acrylic.

7. The fixture of claim 3 wherein the angles formed between the first and second set of sides are other than orthogonal.

8. An alignment fixture for the proper positioning and assembly of the side members of stained glass box and box like items comprising a base having at least 4 edges A, B, C, and D arranged consecutively; edges B and C having respectively planar sides mounted orthogonally to the base and forming there between an angle equal to the internal angle of a regular polygon; the edges A and D being longer than said upstanding sides; said edges A and D and the area between the edges A, B, C, and D being substantially free of upstanding structure; wherein the sides of the fixture are cut away at the theoretical juncture of said planar sides so that the seam formed between two side members when positioned against the sides and pushed together is exposed for an assembly operation.

9. The fixture of claim 8 wherein the assembly operation is soldering and the fixture is resistant to the effects of soldering flux, liquid solder, and inadvertent strikes by a hot soldering iron.

10. The fixture of claim 8 wherein the fixture is made of transparent plastic.

11. The fixture of claim 8 wherein the plastic is acrylic.

* * * * *